US007602965B2

(12) United States Patent
Hong et al.

(10) Patent No.: US 7,602,965 B2
(45) Date of Patent: Oct. 13, 2009

(54) OBJECT DETECTION USING CROSS-SECTION ANALYSIS

(75) Inventors: Lin Hong, Monmouth Junction, NJ (US); Hong Shen, Plainsboro, NJ (US); Shuping Qing, Princeton, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 732 days.

(21) Appl. No.: 11/256,471

(22) Filed: Oct. 21, 2005

(65) Prior Publication Data

US 2006/0093217 A1  May 4, 2006

Related U.S. Application Data

(60) Provisional application No. 60/623,059, filed on Oct. 28, 2004.

(51) Int. Cl.
*G06K 9/00* (2006.01)

(52) U.S. Cl. .................. 382/154; 382/128; 382/278; 382/291

(58) Field of Classification Search .............. 382/128, 382/130, 131, 132, 278, 291
See application file for complete search history.

(56) References Cited

U.S. PATENT DOCUMENTS

| 5,631,424 | A | * | 5/1997 | Nieters et al. ............... 73/598 |
| 5,771,895 | A | * | 6/1998 | Slager ....................... 600/462 |
| 6,377,865 | B1 | * | 4/2002 | Edelsbrunner et al. ......... 700/98 |
| 6,490,476 | B1 | * | 12/2002 | Townsend et al. ........... 600/427 |
| 6,553,356 | B1 | | 4/2003 | Good et al. |
| 6,631,284 | B2 | * | 10/2003 | Nutt et al. .................. 600/427 |
| 6,740,883 | B1 | * | 5/2004 | Stodilka et al. ......... 250/363.04 |
| 2004/0086161 | A1 | | 5/2004 | Sivaramakrishna et al. |

* cited by examiner

*Primary Examiner*—Yosef Kassa
(74) *Attorney, Agent, or Firm*—Donald B. Paschburg; F.Chau & Associates, LLC

(57) ABSTRACT

In a method of 3-D object detection, an image is pre-processed. Using cross-section analysis, a confidence array is built. A plurality of peaks in the confidence array are detected, wherein the peaks signify a likelihood of a 3-D object of interest.

15 Claims, 5 Drawing Sheets

OBJECT DETECTION USING CROSS-SECTION ANALYSIS

CROSS-REFERENCE TO RELATED APPLICATION

This application claims the benefit of U.S. Provisional Application Ser. No. 60/623,059, filed Oct. 28, 2004 and entitled "Cross Section Analysis Method for Object Detection in 3-D Volumetric Data," the content of which is herein incorporated by reference in its entirety.

BACKGROUND OF THE INVENTION

1. Field of the Invention

The present invention relates to object detection, and more particularly to methods and systems for object detection using cross-section analysis.

2. Description of the Related Art

Detection of objects is important in medical and non-medical applications. For example, medical image analysis and diagnosis depends on the ability to detect anatomical structures. Non-medical applications include 3-D facial recognition, such as computer methods that automatically locate human faces in 3-D images.

In object detection, the classes to be discriminated are not defined by the variations of the different objects themselves, but rather by distinguishing between "images containing the object" and "images not containing the object." The existence of complex background structures significantly complicates the detection problem. It is very difficult to design a detection method to efficiently estimate a set of discriminating features that can differentiate the target objects from the complex background structures. In order to compute the values of differentiating features, the target objects need to be identified and separated out first, while in order to detect an object, the differentiating features need to be known.

In recent years, medical imaging has experienced an explosive growth due to advances in imaging modalities such as X-rays, computed tomography (CT), Doppler ultrasound, magnetic resonance (MR), positron emission tomography (PET) and single photon emission tomography (SPET). Two-dimensional (2-D) slices can be combined to generate a three-dimensional (3-D) volumetric model, and many images are now acquired directly as 3-D volumes. For example, low-dose helical CT can be applied as a modality for lung cancer screening. 3-D medical data can produce highly detailed images of internal anatomy having extremely complex formations, such as vessel trees in lung CT data.

FIG. 1 shows examples of medical images exhibiting compact round-shaped objects or nodules. Nodules are due to infections, inflammation, or tumors. Referring to FIG. 1, in the top row, a small square within each slice marks a region exhibiting a nodule, and the 3-D shape of the respective nodules is shown in the corresponding image in the lower row. The left-most and center images of FIG. 1 show nodules occluded by vessel trees. An example of a solid nodule is shown in the right column.

Object detection in 3-D volumetric data with complex non-target background structures is difficult due to the large quantity of data associated with each image, noise level and computational complexity. Many of the techniques that are considered suitable for object detection in 2-D do not have well-defined extensions or effective methods in 3-D. For example, segmentation of a convex curve segment is a relatively well-defined operation in 2-D. Its extension to 3-D, i.e., segmentation of a convex surface patch, is not an easy task, particularly when considering the variations in target objects and the noise on non-target structures. 3-D target objects can reside as geometric solids in volumetric data or targets may be occluded by background structures, which is a very difficult detection scenario to handle. The large quantity of information to be processed in 3-D volumetric data, in general, makes it impractical to select a detection technique that applies sophisticated, computationally expensive analysis to every position (voxel) in the 3-D volumetric data.

A number of techniques are available to compute 3-D shape features that can be used to differentiate compact round-shaped objects and objects with different shape properties. Tang provides a technique based on tensor voting to infer signs and directions of principal curvatures directly from 3-D data. Tang, C. and G. Medioni, G., "Curvature-augmented tensor voting for shape inference from noisy 3-D data," In *IEEE Transactions on Pattern Analysis and Machine Intelligence*, 23(6):858-864, Jun. 2002. Paik provides a computer-aided detection (CAD) method called the surface normal overlap method that is applied to colonic polyp detection and lung nodule detection in helical CT images. Paik, D., Beaulieu, C., Rubin, G., Acar, B., Jeffrey, R., Yee, J., Dey, J. and Napel, S., "Surface Normal Overlap: A computer-aided detection method with application to colonic polyps and lung nodules in helical CT," In *IEEE Transactions on Medical Imaging*, 23(6): 661-75 , Jun. 2004 Rieger provides a technique to estimate curvature of iso gray-level surfaces in gray-value images. Rieger, B., Timmermans, F., Vilet, L., and Verbeek, P., "On curvature estimation of ISO surfaces in 3-D gray-value images and the computation of shape descriptors," In *IEEE Transactions on Pattern Analysis and Machine Intelligence*, 26(8): 1088-94 , Aug. 2004 However, these techniques are not effective in the 3-D detection scenario, for example, because of lack of a well-defined region of interest, lack of robustness to noise, irregularity of the target object (difficult to estimate a consistent Gaussian curvature value), and computational costs.

SUMMARY OF THE INVENTION

According to an exemplary embodiment of the present invention, a method is provided for 3-D object detection. The method includes preprocessing an image; using cross-section analysis, building a confidence array; and detecting a plurality of peaks in the confidence array, wherein the peaks signify a likelihood of a 3-D object of interest.

According to an exemplary embodiment of the present invention, a cross-section analysis method is provided for nodule candidate generation. The method includes preprocessing an image; analyzing 2-D object boundaries, obtaining convex boundary segments; classifying a plurality of points on each convex boundary segment either as 2-D peak points or 2-D convex points; classifying surface points as 3-D peak points, 3-D convex points or normal points; establishing a 3-D confidence array; and detecting a plurality of peaks in the confidence array, wherein peaks signify a likelihood of a 3-D object of interest.

According to an exemplary embodiment of the present invention, a computer readable medium including computer code for 3-D object detection is provided. The computer readable medium comprises: computer code for preprocessing an image; computer code for using cross-section analysis to build a confidence array; and computer code for detecting a plurality of peaks in the confidence array, wherein peaks signify a likelihood of a 3-D object of interest.

According to an exemplary embodiment of the present invention, a computer readable medium including computer code for nodule candidate generation is provided. The computer readable medium comprises: computer code for preprocessing an image; computer code for analyzing 2-D object boundaries to obtain convex boundary segments; computer code for classifying a plurality of points on each convex boundary segment either as 2-D peak points or 2-D convex points; computer code for classifying surface points as 3-D peak points, 3-D convex points or normal points; computer code for establishing a 3-D confidence array; and computer code for detecting a plurality of peaks in the confidence array, wherein peaks signify a likelihood of a 3-D object of interest.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF THE EXEMPLARY EMBODIMENTS

Hereinafter, the exemplary embodiments of the present invention will be described in detail with reference to the accompanying drawings. 3-D medical images can exhibit compact round-shaped objects or nodules, such as in low-dose CT scans for lung cancer screening. The compact round-shaped objects can be geometric solids or occluded by vessel trees. For the purposes of this disclosure, compact round-shaped objects include round-shaped objects, pseudo-round-shaped objects, round disc-shaped objects, etc.

Decomposing 3-D volumetric shape analysis into a number of 2-D cross section analyses of 2-D shape features enables a computationally efficient and robust analysis of 3-D shape features. In a method of 3-D object detection, according to an exemplary embodiment of the present invention, the target objects are effectively differentiated from the background structures using features that can be calculated in local neighborhoods without a specific knowledge of global structures. In an exemplary embodiment of the present invention, a method of 3-D object detection decomposes 3-D shape analysis into a number of 2-D shape analyses in cross section images. In an exemplary embodiment of the present invention, a method of 3-D object detection detects round-shaped objects in 3-D volumetric data using "indirect" 3-D shape features that are derived from a number of cross section analyses. A 3-D object detection method, according to an exemplary embodiment of the present invention, combines features from a number of different cross sections. Hereinafter, a method of 3-D object detection, in accordance with exemplary embodiments of the present invention, will be described with reference to FIGS. 3 to 5

Figure 3:
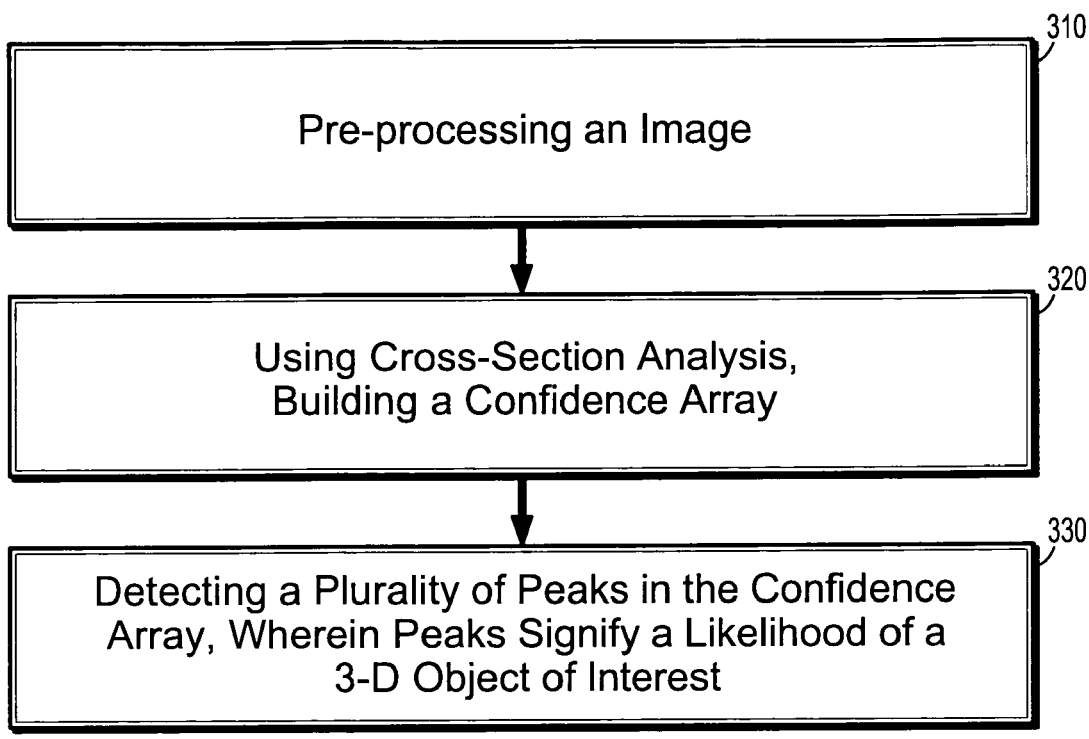
FIG. 3 is a flowchart showing a method of 3-D object detection, according to an exemplary embodiment of the present invention.

FIG. 3 is a flowchart showing a method of 3-D object detection, according to an exemplary embodiment of the present invention. Referring to FIG. 3, in a step 310, an image is preprocessed. Pre-processing an image includes, but is not limited to, image thresholding, region growing, image enhancement, image segmentation, symmetric neighborhood filter or any pre-processing technique for binarization of the image.

Cross-Section Analysis

In a step 320, using cross-section analysis, a confidence array is built. Cross-section analysis can be used to decompose a complicated 3-D shape analysis into a number of 2-D shape analyses of cross-section images, which tend to be more robust to object (target and non-target) variations. Cross-section analysis can be performed sequentially with the intermediate analysis results on cross sections previously processed becoming part of the pre-conditions for the remaining cross sections to be processed. On the other hand, cross-section analysis can be performed independently, where the intermediate results on cross sections are saved and then combined after analyses on all cross sections are completed.

2-D Cross Section Image

Let $V(x, y, z)$ denote the 3-D volumetric image, where $0 \leq x < M$, $0 \leq y < N$, $0 \leq z < P$, and where M, N, and P are the x-, y-, and z-dimensions of the 3-D volumetric image, respectively. A cross-section image is a 2-D image, denoted $I(u,v|d, p)$, which can be defined as:

$$I(u, v \mid d, p) = \left\{ V(R(x, y, z, d_x, d_y, d_z, p)) \middle| \begin{array}{l} xd_x + yd_y + zd_z + p = 0, \\ d_x^2 + d_y^2 + d_z^2 = 1, \\ u = R_x(x, y, z, d_x, d_y, d_z, p), \\ v = R_y(x, y, z, d_x, d_y, d_z, p) \end{array} \right\},$$

where $d=(d_x,d_y,d_z)$ is the normal direction of the cross-section plane on which the cross-section image is sampled, and where p parameterizes the cross-section plane by representing the distance from the origin of the volumetric data to the cross-section plane. It will be understood that the origin can be defined by the data or the user. For example, p can be a slice index which can range from 1 to a maximum number, P', of slices.

$R$, $R_x$, and $R_y$ are the linear mapping functions that map the coordinates in the volumetric data to specific 2-D cross-section images which are uniquely determined by the values of d and p. Given a direction $d=d_0$, a sequence of cross sections $I(u,v|d_0, 1), \ldots, I(u,v|d_0,P')$, where P' is the total number of cross sections perpendicular to direction $d_0$, represents a complete sweep of the 3-D images along direction $d_0$. Neglecting the missing voxels, the 2-D cross-section sequence represents the same image as the original 3-D volumetric image. The shape properties of 2-D objects in cross sections perpendicular to the fixed direction $d_0$ indicate the 3-D shape properties of the corresponding 3-D object in 3-D volumetric image on the cross-section plane that is perpendicular to $d_0$.

Collectively, 2-D shape features in a sufficient number of cross-section images at different directions provide a complete measurement of the 3-D shape properties of the corresponding 3-D object. A method of 3-D object detection, according to an exemplary embodiment of the present invention, performs 2-D analyses on a predetermined number of cross sections of different directions to differentiate different types of 3-D objects. It will be appreciated that two or more different types of 3-D objects in a cross-section image may exhibit the same or similar shape property. However, when the 3-D objects are different in shape, there may be certain cross-section images in which the respective objects exhibit different 2-D shape properties.

Figure 4:
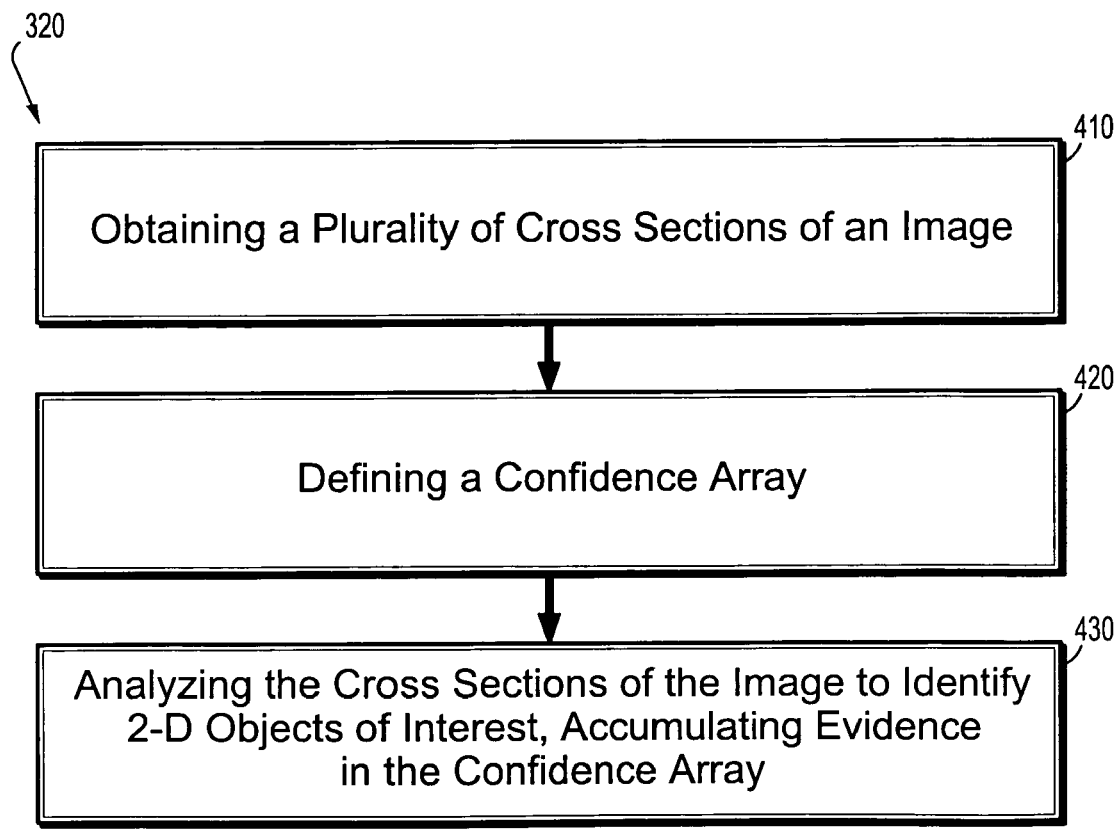
FIG. 4 is a flowchart showing the method of cross-section analysis of FIG. 3.

FIG. 4 is a flowchart showing the method of cross-section analysis of FIG. 3. Referring to FIG. 4, in a step 410, a plurality of cross sections of an image is obtained. It is necessary, in cross-section analysis, to determine the total number of cross sections that are sufficient for differentiating target objects from background structures. Preferably, one selects some particular set of 2-D cross sections that are the most informative. If particular knowledge of shape formations and/or distributions is available, a heuristics-based 2-D cross-section selection method can be incorporated to select the most discriminating set of cross sections. It will be understood that any heuristics-based selection method should be suitable for implementing the present invention.

A method of selecting cross sections, in accordance with an embodiment of the present invention, can be written as:

$$C_0 = \{(1, 0, 0), (0, 1, 0), (0, 0, 1)\},$$

$$C_{i+1} = C_i + \operatorname*{argmax}_{(d_x, d_y, d_z) \in R} \{d_x e_x + d_y e_y + d_z e_z \mid (e_x, e_y, e_z) \in C_i, d_x^2 + d_x^2 + d_x^2 = 1\}.$$

Applying this method, the cross sections that are selected are cross sections that are distributed evenly among different directions. In accordance with an embodiment of the present invention, the three sequences of cross sections perpendicular to the x-, y-, and z-dimensions, respectively, are selected.

In a step 420, a confidence array is defined. The confidence array requires storage. For example, defining a confidence array can include creating an array of a given shape and initializing it with the initial value, or creating an array of a given shape from a pointer, etc. A detailed description of the confidence array is provided later of this disclosure.

In a step 430, the cross sections of the image are analyzed to identify 2-D objects of interest, accumulating evidence in the confidence array. In accordance with an embodiment of the present invention, analyzing the cross sections of the image comprises analyzing 2-D shapes in 2-D cross section images. For example, boundary analysis can be applied to analyze 2-D shapes in 2-D cross section images.

Figure 5:
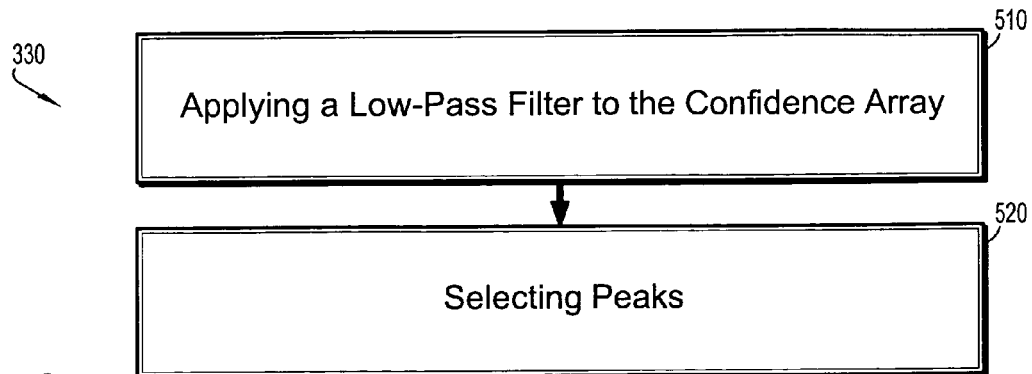
FIG. 5 is a flowchart showing the method of detecting peaks in the confidence array of FIG. 3.

FIG. 5 is a flowchart showing the method of detecting peaks in the confidence array of FIG. 3. Referring to FIG. 5, in a step 510, a low-pass filter is applied to the confidence array. In a step 520, peaks are selected.

Figure 6:
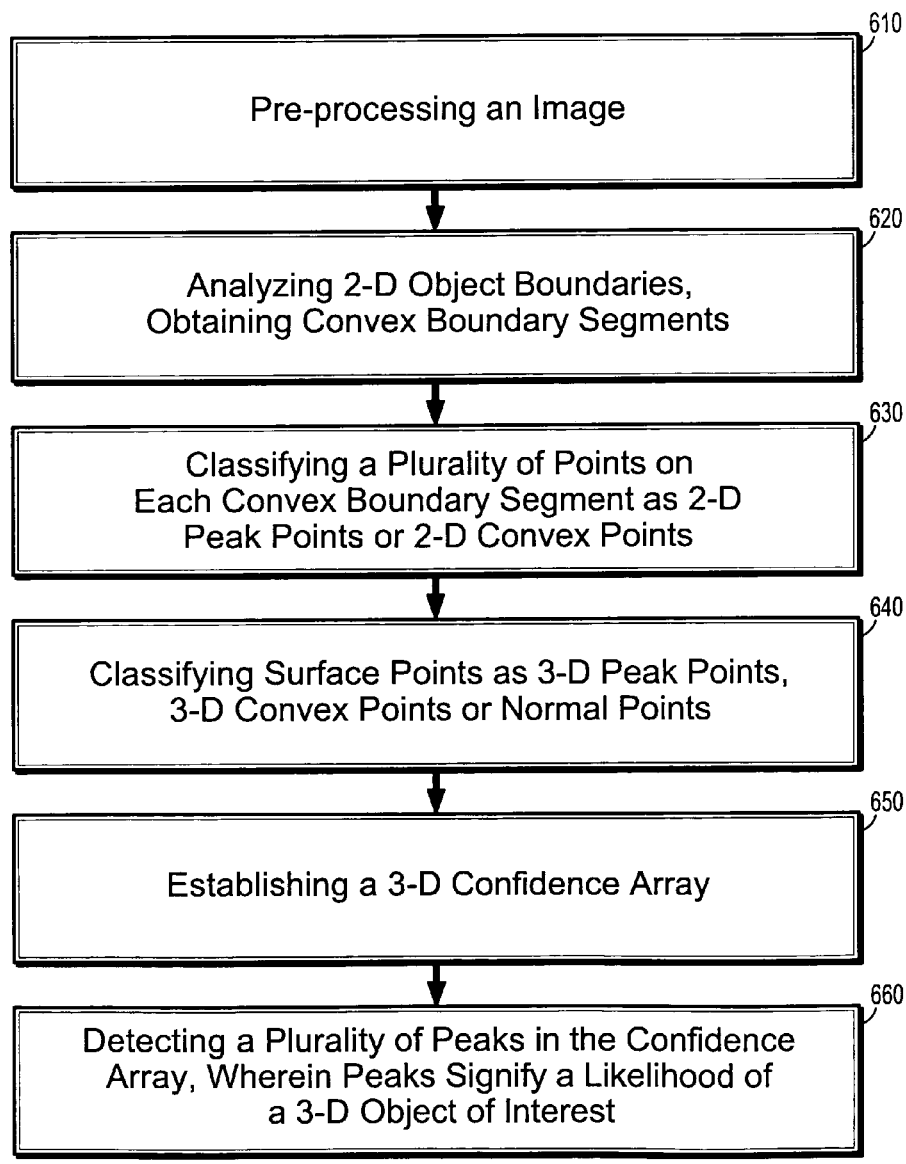
FIG. 6 is a flowchart showing a cross-section analysis method of nodule candidate generation, according to an exemplary embodiment of the present invention.

Hereinafter, a cross-section analysis method of nodule candidate generation, in accordance with an exemplary embodiment of the present invention, will be described with reference to FIG. 6.

Cross-Section Analysis Method of Nodule Candidate Generation

In lung nodule candidate generation, for example, it can be necessary to filter through a huge number of object positions in 3-D volumetric data to identify a relatively small number of candidate positions with nodules. In 3-D volumetric lung CT data, non-nodule tissue structures that are very complex in formations are predominant in the distinguishable objects. Nodules are the round-shaped objects that reside near, or are occluded by, the complex non-nodule tissue structures. FIG. 6 is a flowchart showing a cross-section analysis method of nodule candidate generation, according to an exemplary embodiment of the present invention.

The main task of a nodule candidate generation method is to differentiate variations of compact round-shaped nodules from objects such as vessel trees that generally exhibit a cylindrical shape property. Referring to FIG. 6, in a step 610, an image is preprocessed. Pre-processing an image includes, but is not limited to, image thresholding, region growing, image enhancement, image segmentation, symmetric neighborhood filter or any pre-processing technique for binarization of the image. Target nodule objects and other tissue structures with high intensity values are labeled as foreground objects. Note that even though certain sophisticated pre-processing methods may be applied, it is not practical to assume that nodules are well differentiated from the other foreground structures in the binary segmented lung images. Variations of nodule shape, complexities of vessel tree structures and variations, occlusion, noise, etc. make it difficult to differentiate a nodule from the non-nodule tissue structures.

A cross-section analysis method of nodule candidate generation, according to an exemplary embodiment of the present invention, can be written as:

1. For each direction $d \in \{ (1,0,0), (0,1,0), (0,0,1)\}$ begin
   a. For each cross section $I \in \{I(u,v|d,1),...,I(u,v|d,P')\}$ begin
      i. Trace boundary of every foreground object
      ii. Break each boundary of significant size into a number of curve segments using curvature and identify convex segments
      iii. Classify points on each convex segment either as peak points or convex points.
      end
   end
2. Classify each surface point as (i) peak or (ii) convex or (iii) normal.
3. For each direction $d \in \{ (1,0,0), (0,1,0), (0,0,1)\}$ begin
   a. For each cross section $I \in \{I(u,v|d,1),...,I(u,v|d,P')\}$ begin
      i. Trace boundary of every foreground object
      ii. If the boundary is a small closed circular boundary, accumulate a score at $\Omega(x,y,z)$, where $(x,y,z)$ is the corresponding centroid of the closed boundary.
      iii. If there is a peak on a convex boundary segment, accumulate a score at $\Omega(x,y,z)$, where $(x_i,y_i,z_i)$ is the intersection position of two lines passing the peak point and the convex point neighbor i along the corresponding normal directions.
      end
   end Curvature provides key clues about the presence of nodules. Referring to FIG. 6, in a step 620, 2-D object boundaries are analyzed to obtain convex boundary segments. 2-D object boundaries (curves) are analyzed to identify prominent convex boundary segments, which are effective indicators of the presence of round-shaped objects.

In a step 650, a 3-D confidence array is established. The 3-D confidence array corresponding to the 3-D volumetric data, $\Omega(x,y,z)$, where $0 \leq x < M$, $0 \leq y < N$, $0 \leq z < P$, is established to keep track of the accumulated evidence, which are scalar values that quantize the likelihood of the presence of convex boundary segments. If a compact round-shaped object is present, there will be a significant concentration of evidence accumulated around the center of the object in the confidence array. A compact round shaped object may be occluded by vessel trees. So long as the object can be sufficiently differentiated from the tree vessels, there is a high probability that it generates more convex boundary segments across different 2-D cross sections as compared to vessel tree structures. For example, a compact round shaped object which is occluded by vessel trees is sufficiently differentiated from the vessel trees if it appears (based on the object's non-occluded parts) that the object may be a round-shaped object.

In accordance with one embodiment of the present invention, the cross-section analyses are only performed on cross sections that are perpendicular to the x-, y-, and z-dimensions. Analyses on three cross sections that are perpendicular to each other can be used to obtain a sufficiently accurate detection (more cross sections can be used for an even more reliable detection). For example, in the case of nodule candidate generation, the use of three cross sections that are perpendicular to each other is a minimum but sufficient decomposition.

Without loss of generality, let $V(x,y,z)$, where $0 \leq x < M$, $0 \leq y < N$, $0 \leq z < P$, denote the 3-D binary volumetric image with voxels comprising objects (nodules, vessel trees, etc.) labeled value 1 as foreground and others labeled value 0 as background. The neighborhood of a voxel at $(x,y,z)$ in V, $N(x,y,z)$ consists of all the positions around $(x,y,z)$:

$$N(x, y, z) = \left\{ (u, v, w) \left| \begin{array}{l} 0 \leq u < M, 0 \leq v < N, 0 \leq w < P, \\ L((x, y, z), (u, v, w)) \leq L_0, \\ (x, y, z) \neq (u, v, w) \end{array} \right. \right\},$$

where L is a distance function between two points, and where the value of $L_0$ determines the size of the neighborhood. Depending on the definition of a distance function L and the value of $L_0$, different types of neighborhoods can be defined. In at least one embodiment of the present invention, $L_0=1$ It will be understood that $L_0$ is a small number, such as 1 or 2 Two voxels are connected if they are neighbors. A 3-D connected object is a foreground object consisting of connected voxels. Nodules can be compact 3-D connected foreground objects or a small 3-D connected part of a larger connected object. A surface point of an object in V is defined as a foreground point which has at least one neighbor labeled as background. 3-D objects in V become 2-D objects in sliced cross-section images. Let $I(x, y)$, where $0 \leq x < M', 0 \leq y < N'$, denote a binary cross-section image in which foreground objects (nodules, vessel trees, etc.) are labeled 1 and others labeled 0 The neighborhood of a pixel $(x,y)$ in I consists of positions nearby $(x,y)$ can be determined as:

$N(x,y)=\{(u,v)|0 \leq u < M', 0 \leq v < N', L(x,y),(u,v)) \leq L_0, (x,y) \neq (u,v)\}$, where L is a distance function between two position and $L_0$ is the size of the neighborhood. A 2-D connected object in I is a foreground object of connected pixels in I. A point is called boundary point if it is labeled 1 and has at least one neighbor labeled 0 The boundary of a 2-D connected object is a closed chain of all the boundary points of the objects ordered with each point having exactly two neighbor points. A boundary segment is a continuous segment of the boundary points with only two points (ends) having exactly one neighbor point.

In a 2-D cross-section image, the boundary of a 2-D object consists of surface points of the corresponding 3-D object on the cross-section plane whose 2-D shape formations provide information about the shape properties of the 3-D object. The boundary of the 2-D object can be obtained using a boundary trace method. It will be understood that any boundary analysis method, such as a boundary trace method, should be suitable for implementing the present invention.

Here, we are interested in assessing the closed circular curves or convex segments that are sufficiently circular in shape, which provide strong indication of the existence of nodules. A boundary of small size may be from a nodule cross section, or a cross section of a vessel tree branch which is roughly perpendicular to the cross-section plane. A boundary of a significant size may be formed by boundary segments from nodules and non-nodule structures. The boundary segments from nodules tend to exhibit convex circular shape, which is a distinguishable property that can be used to identify nodules. Non-nodule structures can also produce such convex circular shaped segments in certain cross sections. However, collectively, only nodules exhibit such a property in all cross sections.

Let $B=\{(x(t),y(t)); t=1:S\}$ be a closed boundary traced a cross-section image, where S represents the perimeter of B. Normalized curvature at point $(x(t), y(t))$, $cur(t)$, is defined as $$cur(t) = \left[ tg^{-1}\left(\frac{\Delta y(t)/\Delta t}{\Delta x(t)/\Delta t}\right) + 2\pi \right] \bmod 2\pi,$$

where $\Delta$ is the difference operator. This definition is a "normalized" version of curvature with a range of about 0 to about $2\pi$. A value at t, $cur(t)$ that is less than $\pi$ means that the boundary is concave at t; otherwise the boundary is convex. A convex segment is a boundary segment in B such that $cur(t) > cur+$, where $cur+$ is a first threshold value. For example, the first threshold value $cur+$ is in the range of about $\pi$ to about $1.25\pi$.

In a step 630, a plurality of points on each convex boundary segment are classified as either 2-D peak points or 2-D convex points. A boundary point is said to be a "2-D peak point" if either, (1) it is a boundary point of a circular boundary with a perimeter less than $S_p$ (e.g., $S_p=20$ pixel) or, (2) it is on a segment with a normalized curvature larger than $cur_{peak}$. A boundary point is said to be a "2-D convex point" if it is on a convex segment with a normalized curvature larger a second threshold value $cur++$.

In a step 640, surface points are classified as 3-D peak points, 3-D convex points or normal points. Using the convex segments and the boundary point types in each cross section, a classification process combines information from different cross sections to produce a more refined assessment of the likelihood of a presence of nodules at candidate positions. In the classification process, every surface point is classified into one of the following point categories: (i) peak, (ii) convex, or (iii) normal. A point is classified as a 3-D peak point if the point is a 2-D peak point in all its 2-D cross sections. A point is a 3-D convex point if (a) it is not a 3-D peak point and (b) it is a 2-D peak point or 2-D convex point in all its 2-D cross sections. A point is normal if it is not in either of the point categories (i) or (ii).

A peak surface point (3-D peak point) implies the presence of a partial round shaped object, which strongly suggests the presence of nodules. It will be understood that the term "surface" refers to a 3-D surface.

A convex surface point (3-D convex point) provides relatively weaker evidence of the presence of nodules. A normal surface point does not provide any evidence, i.e., it is neutral.

The evidence of the presence of nodules is accumulated in the confidence array, $\Omega$, for example, using two schemes according to the boundary types and the point category information, in the step 650. For a round-shaped closed boundary of small size (e.g., perimeter less than $S_p$), the confidence score at the position in $\Omega$ corresponding to the centroid of the closed boundary, B, is augmented with a score, $\epsilon$, which can be weighted as:

$$\varepsilon = A \sum_{t=1,S} \frac{W(B(t))}{S}$$

where S is the perimeter of B, W defines a weight function which award a positive value to peak point (e.g., a constant, such as 4), A is a weight factor used to balance the two scoring scheme. For a convex segment which contains peak points, the confidence score at each position in $\Omega$ corresponding to the intersection of the line passing through the peak point along the normal direction and the line passing through each convex neighbor is augmented by a score according to the type of the neighbor (e.g., 1 for convex neighbor and 2 for peak neighbor).

The confidence array, $\Omega$ defines a generalized parameter space to keep track of the likelihood of the presence of 3-D objects of interest. The accumulation of evidence is governed by the weighting scheme on peak point, convex points, 2-D circular closed boundaries, and convex segments instead of a set of parameterized equations.

The normalized curvature estimation can use a multi-stage method. Curvature values are estimated using multiple windows at each point. The method first locates the concave peaks which are the significant local minimum of the normalized curvature on the boundary. Then it decomposes the boundary into a number of small convex segments. Finally, the normalized curvature value is estimated inside each convex segment using multiple windows iteratively.

Figure 1:
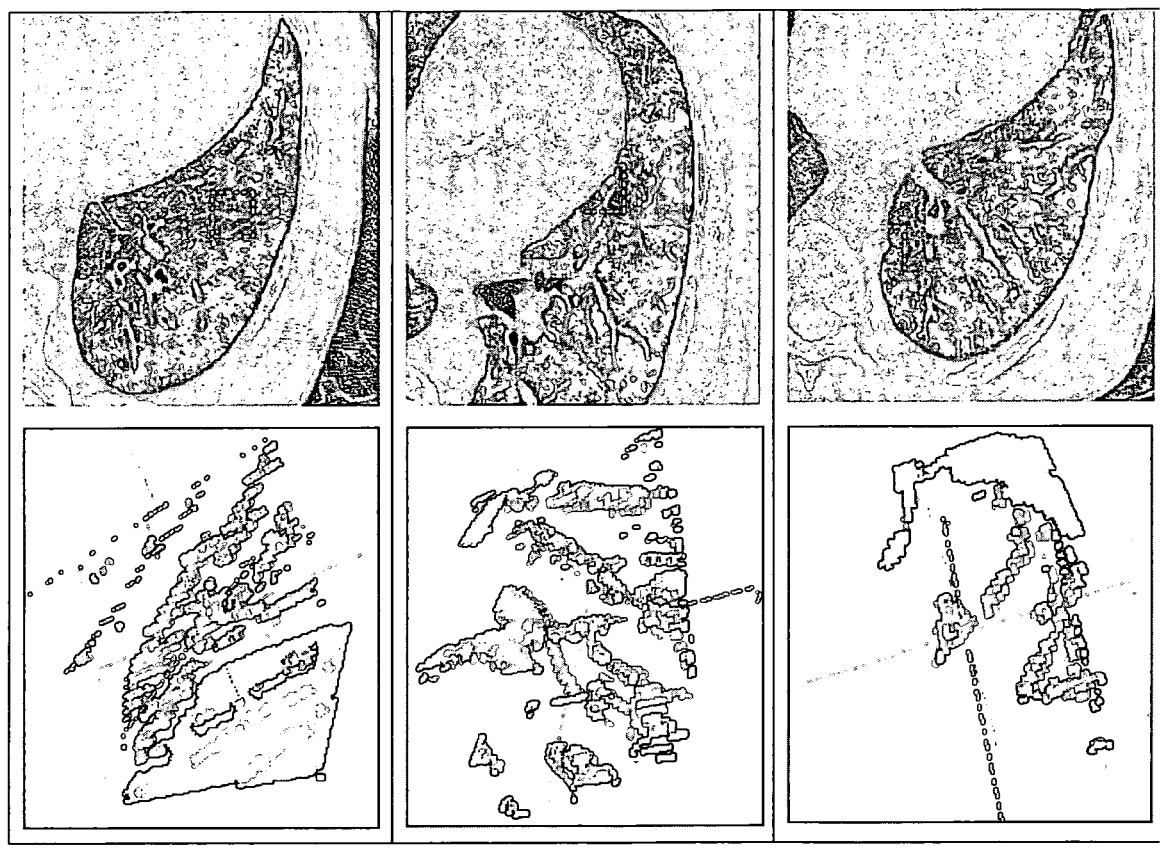
FIG. 1 shows examples of medical images exhibiting compact round-shaped objects or nodules.
Figure 2:
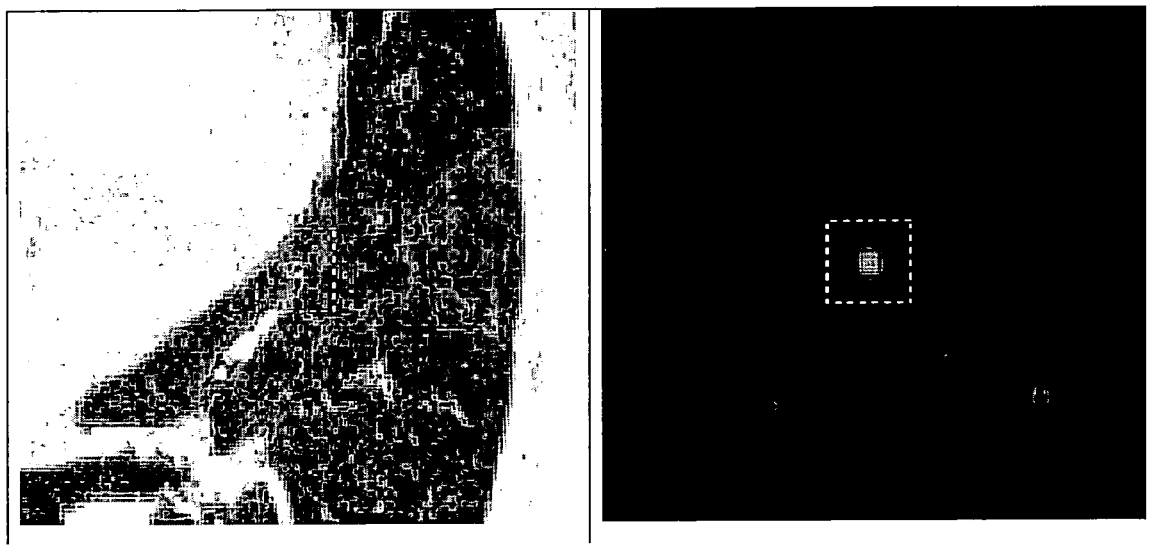
FIG. 2 shows an example of evidence concentration of a nodule.

In a step 660, a plurality of peaks in the confidence array are detected, wherein peaks signify a likelihood of a 3-D object of interest. The values in the confidence array, $\Omega$ indicate the likelihood of the presence of round-shaped objects. Due to variations of target objects and occlusions, the evidence of presence of a nodule forms a concentration of a significant number of positions in a local neighborhood of high confidence scores. An example of evidence concentration of a nodule is shown in FIG. 2.

A smoothing operation can be performed before applying local peak detection to detect local concentration peaks to generate a list of candidate positions. A local peak detection method, according to an embodiment of the present invention, can be written as:

1. A local maximum detection method is first applied to detect potential peak candidate positions.

2. If the detected position is not inside the foreground region, a local searching process is applied to find the nearest foreground point as the new detected position.

3. A control volume growing operation which grows within the foreground regions with a limited growing size is applied to obtain the updated weighted sum of confidence scores. All surrounding voxels within a small distance of the detected position are labeled as processed.

A local maximum point is a point in $\Omega$, which has the largest confidence score in a local neighborhood. The point is located in a local neighborhood with a size of the same as the max detectable object, for example, 10 mm. This point is not necessary inside the object duo different variations and noises. A local search can be applied in the method to ensure that it is inside a foreground region.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Hereinafter, a computer readable medium including computer code for 3-D object detection, in accordance with an embodiment of the present invention, is described. The computer readable medium comprises: computer code for thresholding an image; computer code for using cross-section analysis to build a confidence array; and computer code for detecting peaks in the confidence array, wherein peaks signify a likelihood of an object.

In one embodiment of the present invention, the computer code for using cross-section analysis includes computer code for obtaining a plurality of cross-sections of images; computer code for defining a confidence array; and computer code for performing analysis of the cross-section images to identify 2-D objects of interest to accumulate evidence in the confidence array.

Figure 7:
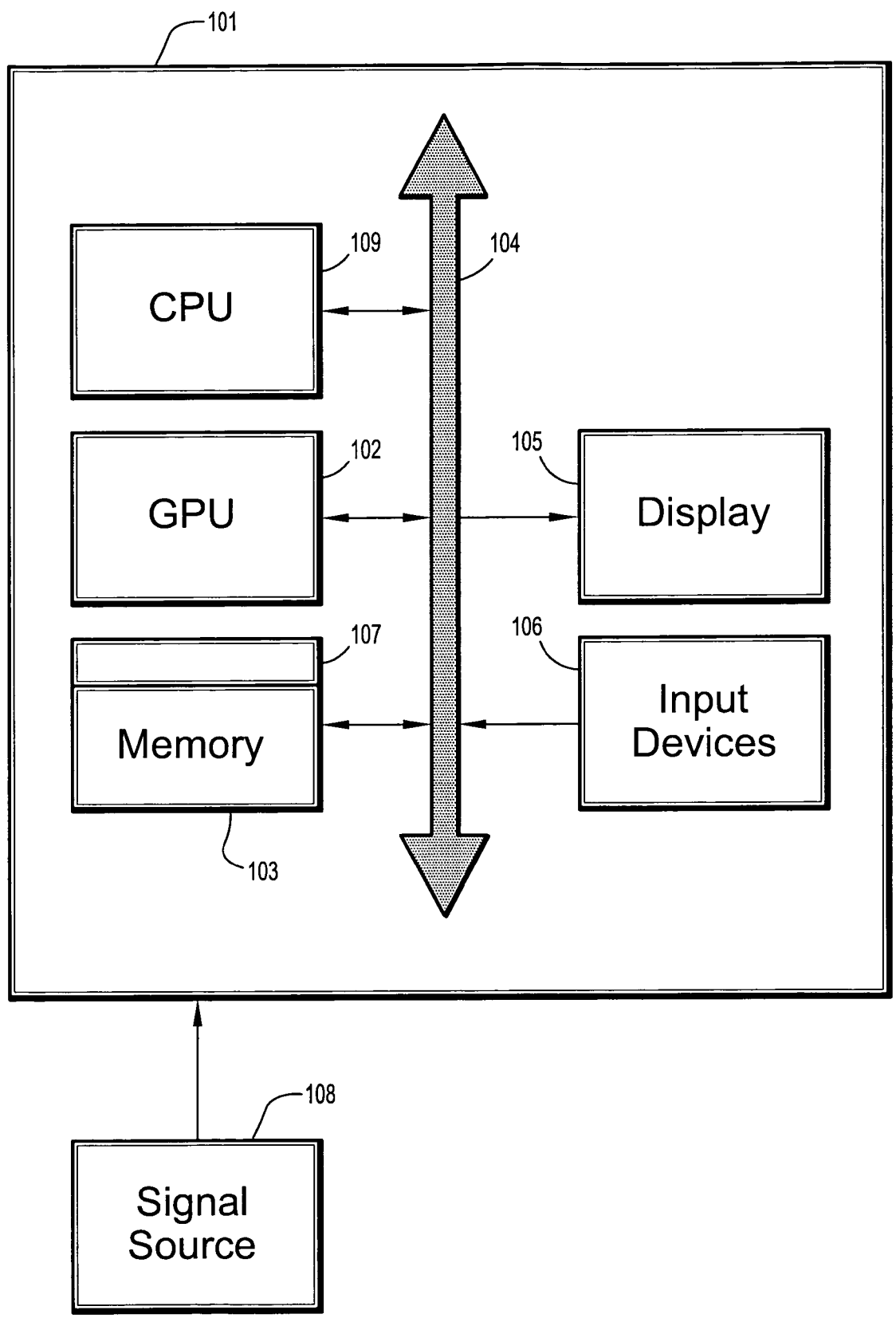
FIG. 7 illustrates a computer system for implementing a method of aligning images, according to an exemplary embodiment of the present invention.

Referring to FIG. 7, according to an embodiment of the present disclosure, a computer system 101 for implementing a method of 3-D object detection can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an exemplary embodiment of the present invention, a computer readable medium including computer code for nodule candidate generation is provided. The computer readable medium comprises: computer code for preprocessing an image; computer code for analyzing 2-D object boundaries to obtain convex boundary segments; computer code for classifying a plurality of points on each convex boundary segment either as 2-D peak points or 2-D convex points; computer code for classifying surface points as 3-D peak points, 3-D convex points or normal points; computer code for establishing a 3-D confidence array; and computer code for detecting a plurality of peaks in the confidence array, wherein peaks signify a likelihood of a 3-D object of interest.

Although the processes and apparatus of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the spirit and scope of the invention as defined by the appended claims.

What is claimed is:

1. A system for 3-D object detection comprising:
 a memory device for storing a program; and
 a processor in communication with the memory device, the processor operative with the program to perform a method, the method comprising:
 pre-processing an image;
 using cross-section analysis, building a confidence array; and
 detecting a plurality of peaks in the confidence array, wherein peaks signify a likelihood of a 3-D object of interest,
 wherein cross-section analysis comprises:
 obtaining a plurality of cross sections of an image;
 defining a confidence array; and
 analyzing the cross sections of the image to identify 2-D objects of interest, accumulating evidence in the confidence array, and
 wherein cross-section analysis is performed on cross sections perpendicular to the x-, y-, and z-dimensions, respectively.

2. The system of claim 1, wherein pre-processing an image comprises thresholding the image.

3. The system of claim 1, wherein cross-section analysis is performed on cross sections evenly distributed among different directions.

4. The system of claim 1, wherein analyzing the cross sections of the image comprises analyzing 2-D shapes in 2-D cross section images.

5. The system of claim 4, wherein analyzing 2-D shapes in 2-D cross section images comprises using boundary analysis.

6. The system of claim 1, wherein detecting peaks in the confidence array comprises:
 applying a low-pass filter to the confidence array; and
 selecting peaks.

7. The system method of claim 1, wherein the object is a compact round-shaped object.

8. A cross-section analysis system for nodule candidate generation comprising:
 a memory device for storing a program: and
 a processor in communication with the memory device, the processor operative with the program to perform a method, the method comprising:
 pre-processing an image;
 analyzing 2-D object boundaries, obtaining convex boundary segments:
 classifying a plurality of points on each convex boundary segment as 2-D peak points or 2-D convex points;
 classifying surface points as 3-D peak points, 3-b convex points or normal points;
 establishing a 3-D confidence array; and
 detecting a plurality of peaks in the confidence array, wherein peaks signify a likelihood of a 3-D object of interest.

9. The cross-section analysis system of claim 8, wherein pre-processing an image comprises thresholding the image.

10. The cross-section analysis system of claim 8, wherein analyzing 2-D object boundaries comprises:
 tracing a boundary of a foreground object in a cross section;
 breaking the boundary into a number of curve segments using curvature; and
 identifying convex boundary segments.

11. The cross-section analysis system of claim 10, wherein each of the convex boundary segments have a normalized curvature larger than a predetermined value.

12. The cross-section analysis system of claim 8, wherein a point is classified as a 3-D peak point if the point is a 2-D peak point in all its 2-D cross sections.

13. The cross-section analysis system of claim 8, wherein a point is a 3-D convex point if (a) it is not a 3-D peak point and (b) it is a 2-D peak point or 2-D convex point in all its 2-D cross sections.

14. A computer readable medium including computer code for 3-D object detection, the computer readable medium comprising:
 computer code for preprocessing an image;
 computer code for using cross-section analysis to build a confidence array; and
 computer code for detecting a plurality of peaks in the confidence array, wherein peaks signify a likelihood of a 3-D object of interest,
 wherein the computer code for using cross-section analysis to build a confidence array comprises:
 computer code for obtaining a plurality of cross-sections of images;
 computer code for defining a confidence array; and
 computer code for performing analysis of the cross-section images to identify 2-D objects of interest to accumulate evidence in the confidence array and
 wherein cross-section analysis is performed on cross sections perpendicular to the x-, y-, and z-dimensions, respectively.

15. A computer readable medium including computer code for nodule candidate generation, the computer readable medium comprising:
 computer code for preprocessing an image;
 computer code for analyzing 2-D object boundaries to obtain convex boundary segments;
 computer code for classifying a plurality of points on each convex boundary segment as 2-D peak points or 2-D convex points;
 computer code for classifying surface points as 3D peak points, 3-D convex points or normal points;
 computer code for establishing a 3D confidence array; and
 computer code for detecting a plurality of peaks in the confidence array, wherein peaks signify a likelihood of a 3-D object of interest.

* * * * *

UNITED STATES PATENT AND TRADEMARK OFFICE
CERTIFICATE OF CORRECTION

PATENT NO. : 7,602,965 B2
APPLICATION NO. : 11/256471
DATED : October 13, 2009
INVENTOR(S) : Hong et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Fifth Day of October, 2010

David J. Kappos
*Director of the United States Patent and Trademark Office*